Aug. 4, 1970     F. J. GAMARI ET AL     3,523,224
NICKEL-NICKEL OXIDE CAPACITOR
Filed Nov. 12, 1968
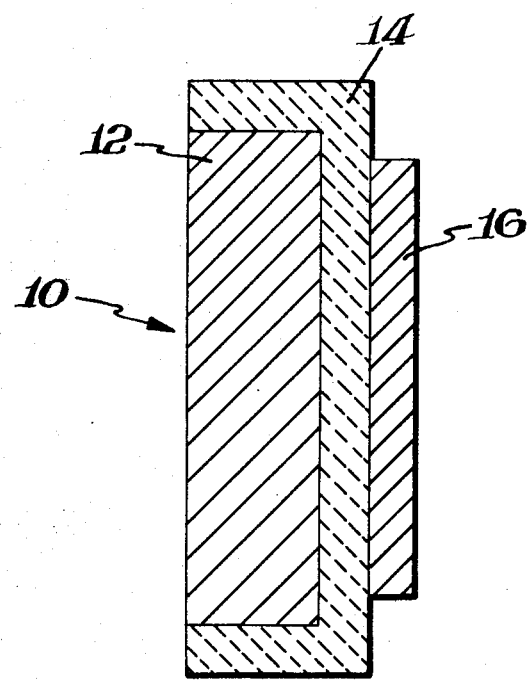

United States Patent Office 3,523,224
Patented Aug. 4, 1970

3,523,224
NICKEL-NICKEL OXIDE CAPACITOR
Francis J. Gamari and John J. Randall, Jr., Williamstown, Mass., assignors to Sprague Electric Company, North Adams, Mass., a corporation of Massachusetts
Filed Nov. 12, 1968, Ser. No. 774,955
Int. Cl. H01g 1/01
U.S. Cl. 317—258                              8 Claims

ABSTRACT OF THE DISCLOSURE

A capacitor has a nickel electrode having a surface nickel oxide dielectric formed thereon and a counterelectrode deposited on the oxide dielectric. The nickel electrode, after surface oxidation, is characterized by having substantially no intergranular oxidation within the metal. Preferably the nickel electrode is an alloy containing at least 90% nickel. The crystalline orientation of the nickel electrode should include at least 5% of the (100) orientation.

BACKGROUND OF THE INVENTION

The invention is concerned with a nickel-nickel oxide capacitor.

Metal oxide capacitors have been developed from a number of metals which include tantalum, aluminum, silicon, and titanium where the capacitive system consists of metal-metal oxide-metal counterelectrode. Nickel oxide has found little use as a suitable dielectric for capacitors. One reason why nickel has not been seriously considered as a capacitor material is that it is reported that thermally formed nickel oxides do not adhere well to the base metal. An excellent market for a nickel-nickel oxide capacitor exists if the problems involved in obtaining a good quality, adherent dielectric film can be overcome.

An object of the invention is to present a novel nickel capacitor having uniquely desirable dielectric properties.

Another object is to present a nickel capacitor having good nickel oxide adhesion.

These and other objects and advantages of the present invention will be made obvious to those skilled in the art by the following description.

SUMMARY OF THE INVENTION

The capacitor of the present invention employs a nickel electrode which has a surface nickel oxide dielectric formed thereon. The oxidized nickel electrode is characterized by having substantially no inter-granular or inter-crystalline oxidation. A counterelectrode is in contact with the oxide dielectric. Preferably the nickel electrode is an alloy containing at least 90% nickel. In one preferred embodiment of the invention, the nickel contains a minor proportion of either cobalt or thorium. In the case of cobalt the minor proportion is from 0.005%–0.5%. In the case of thorium the minor proportion is from 1–10%. In another embodiment of the present invention it is preferred that the nickel electrode have a crystalline orientation which includes at least 5% of the (100) orientation. It is further preferred that the average crystalline grain size of the crystals is from 30 to 60 microns.

BRIEF DESCRIPTION OF THE DRAWING

The drawing shows a side view in section of a capacitor of the present invention.

The following example illustrates the preparation of capacitors employing three different starting materials. One was a nickel-cobalt alloy containing 0.1% cobalt. Another was a nickel-thorium alloy containing 2.0% thoria. The third was a nickel of 99.99% purity and known not to contain either cobalt or thorium.

EXAMPLE

After thoroughly cleaning the three nickel starting materials, a plurality of ½ inch diameter circular discs were punched out of the sheets. The discs were about 10 mils thick. The nickel discs were placed on a suitable support plate and thermal oxidation of the nickel was performed in an air atmosphere in a muffle furnace. Thermal oxidation was continued until a nickel oxide film of approximately 20 microns was formed. The oxide film formed on the edges and on both broad surfaces of the nickel discs. Oxide was removed from one broad surface of the discs to permit contact to the nickel. Silver counterelectrodes were screened on the broad oxidized surface of the nickel discs. The counterelectrodes were approximately ⅜ inch in diameter, allowing a ¹⁄₁₆ inch spacing between it and the edge of the discs. The silver counterelectrodes were fired on at a temperature near the melting point of silver.

The capacitor 10, illustrated in the drawing, has a nickel electrode 12, the side surfaces and one broad surface of which has a nickel oxide dielectric 14 formed thereon and a noble metal counterelectrode 16 in contact with said dielectric.

DETAILED DESCRIPTION OF THE INVENTION

It has been determined that the quality of a nickel oxide dielectric and the strength of its adherence to the surface of nickel is dependent to a large extent upon the characteristics of the nickel substrate. Good adhesion and good electrical characteristics are found whenever the crystalline orientation of the nickel includes at least 5% of the (100) orientation and preferably when it includes from 5–15% of the (100) orientation. It has further been determined that the optimum average crystalline grain size should be from 30 to 60 microns. This crystalline grain size is considerably larger than that found in nickel having a hardness falling below 150 on the Vickers hardness scale. When nickel has all of the desirable characteristics indicated, an oxidized specimen will reveal substantially no inter-granular or inter-crystalline oxidation.

One means by which these desirable characteristics can be insured in the nickel starting material is by the formation of a nickel alloy by the inclusion therein of minor proportions of certain metal elements. The nickel content should be at least 90% of the alloy. Examples of two metals which may be added are cobalt and thorium. A preferred minor proportion of cobalt is from 0.005%–0.5% and a preferred minor proportion of thorium is from 1–10%.

Electrical measurements revealed that the cobalt-containing nickel capacitors had a capacitance averaging about 230 picofarads, with an average insulation resistance of greater than 200,000 megohms. The thorium-containing nickel capacitors had an average capacitance of approximately 115 picofarads and an insulation resistance of greater than 200,000 megohms. The 99.99% nickel capacitors, containing neither cobalt nor thorium, had an average capacitance of approximately 290 picofarads and an average insulation resistance of approximately 50 megohms making it of no utility as a commercial capacitor. Examination of the crystalline structure of the cobalt and thorium containing nickel capacitors showed that the nickel electrode had comparatively large crystals with virtually no inter-crystalline oxidation. On the other hand, examination of the 99.99% nickel containing neither cobalt nor thorium revealed a crystalline structure significantly smaller than that of the cobalt and thorium containing nickel and there was considerable niter-granular oxidation. It is believed that the reason for the extremely low insulation resistance of the units was caused by the high degree of intercrystalline oxidation which tends to mechanically disrupt the oxide film and cause comparatively poor adhesion of the oxide film to the surface of the nickel electrode. It was also observed that the crystalline orientation of both the cobalt and thorium containing nickel included approximately 10% of the (100) orientation. The 99.99% nickel containing neither cobalt nor thorium showed virtually no (100) orientation.

It has also been determined that the oxide thickness and its value can be maintained constant after the thermal growth thereof by the proper selection of counterelectrode material. If the counterelectrode material selected is oxygen pervasive during the firing on thereof, the nickel will further oxidize and its value will change. In order to avoid this, one should select a counterelectrode that is oxygen impervious or the counterelectrode should be fired on in a low oxygen or inert, oxygen-free atmosphere. Suitable oxygen impervious electrodes are gold, the platinum group metals and their oxygen impervious alloys. Silver which by itself will transit oxygen, can be alloyed with the platinum group metals to yield oxygen impervious alloys. Lead borosilicate can be added to silver to render it oxygen impervious.

The capacitor geometry can be any of the known prior art structures. For example, in addition to the structure described in the specific example the capacitor can have oxidized surfaces on both sides of the nickel disc and counterelectrodes applied to both of the oxidized surfaces to result in two series-connected capacitors.

It will also be understood that the capacitors of the present invention can employ the so-called solid electrolyte technlogy which has grown up about tantalum capacitors. More specifically, semiconductive solid electrolytes such as $MnO_2$ can be employed. Silver electrodes can then be contacted to the solid electrolyte surface to complete the capacitor.

While this invention has been disclosed with respect to particular embodiments, numerous modifications may be made by those skilled in the art without departing from its spirit and scope. It is intended that the appended claims over all such modifications and variations which come within the spirit and scope of the present invention.

What is claimed is:

1. A capacitor comprising a nickel electrode having a surface nickel oxide dielectric formed thereon and a counterelectrode on said oxide, the crystalline structure of said nickel electrode being characterized by having at least 5% of the (100) orientation, a crystalline grain size of from 30 to 60 microns and a hardness falling above 150 on the Vickers hardness scale.

2. The capacitor of claim 1 wherein the nickel electrode is a nickel alloy containing at least 90% nickel.

3. The capacitor of claim 2 wherein said nickel contains a minor proportion of a member of the group consisting of cobalt and thorium.

4. The capacitor of claim 3 wherein said minor proportion of cobalt is from 0.005%–0.5% and said minor proportion of thorium is from 1–10%.

5. The capacitor of claim 4 wherein said nickel has a crystalline orientation including from 5–15% of the (100) orientation.

6. The capacitor of claim 1 including an oxygen impervious counterelectrode.

7. The capacitor of claim 4 including an oxygen-impervious counterelectrode.

8. The capacitor of claim 5 including an oxygen-impervious counterelectrode.

References Cited

UNITED STATES PATENTS

| | | | |
|---|---|---|---|
| 1,971,076 | 8/1934 | Lowry | 148—31.5 |
| 2,299,228 | 10/1942 | Gray | 317—258 X |
| 3,353,124 | 11/1967 | Dilger | 317—258 X |

OTHER REFERENCES

Brady: Materials Handbook, ninth edition, McGraw-Hill, N.Y., 1963, p. 503.

The Condensed Chemical Dictionary, sixth edition, Reinhold, N.Y., 1962, p. 794.

ELLIOT A. GOLDBERG, Primary Examiner

U.S. Cl. X.R.

75—170; 148—31.5